(12) United States Patent
Tissot (10) Patent No.: US 10,649,126 B2
(45) Date of Patent: May 12, 2020

(54) HOLDER AND SYSTEMS FOR WAVEGUIDE-BASED ILLUMINATION

(71) Applicant: L.E.S.S. Ltd, Ecublens (CH)

(72) Inventor: Yann Tissot, Lausanne (CH)

(73) Assignee: L.E.S.S. LTD, Renens (CH)

( * ) Notice: Subject to any disclaimer, the term of this patent is extended or adjusted under 35 U.S.C. 154(b) by 187 days.

(21) Appl. No.: 15/030,041

(22) PCT Filed: Oct. 17, 2014

(86) PCT No.: PCT/IB2014/065386
§ 371 (c)(1),
(2) Date: Apr. 15, 2016

(87) PCT Pub. No.: WO2015/056220
PCT Pub. Date: Apr. 23, 2015

(65) Prior Publication Data
US 2016/0252666 A1     Sep. 1, 2016

Related U.S. Application Data

(60) Provisional application No. 61/892,899, filed on Oct. 18, 2013.

(51) Int. Cl.
*G02B 6/00*  (2006.01)
*F21V 8/00*  (2006.01)
*F21V 9/30*  (2018.01)

(52) U.S. Cl.
CPC ............... *G02B 6/001* (2013.01); *F21V 9/30* (2018.02); *G02B 6/0003* (2013.01)

(58) Field of Classification Search
CPC .... G02B 6/001; G02B 6/0003; G02B 6/0006; G02B 6/0001; G02B 6/4295;
(Continued)

(56) References Cited

U.S. PATENT DOCUMENTS 4,138,194 A   2/1979   Beasley et al.
5,222,794 A   6/1993   Windross
(Continued)

FOREIGN PATENT DOCUMENTS

CN          1981220 A      6/2007
CN        101839407 A      9/2010
(Continued)

OTHER PUBLICATIONS

PCT International Search Report and Written Opinion (dated Jul. 2, 2012), International Application No. PCT/B2012/000617—International Filing Date Mar. 28, 2012, 13 pages.
(Continued)

*Primary Examiner* — Y M. Quach Lee
(74) *Attorney, Agent, or Firm* — Womble Bond Dickinson (US) LLP (57) ABSTRACT

A holder has a support structure in which a groove is formed and is sized to receive therein a side of a waveguide that is fixed in position next to a surface of the groove. The groove runs in a longitudinal direction, along the length direction of the waveguide. The holder a) reflects, diffuses or absorbs some of the out-coupled from the side of the waveguide, or b) wavelength converts some of the out-coupled light, to produce side illumination that emerges from a side of the holder. Other embodiments are also described and claimed.

21 Claims, 8 Drawing Sheets

(58) Field of Classification Search
CPC ........ G02B 6/4429; G02B 6/443; B60Q 3/62; B60Q 3/64; B60Q 3/66; F21V 9/30
See application file for complete search history.

(56) References Cited

U.S. PATENT DOCUMENTS

| | | | |
|---|---|---|---|
| 5,579,429 A | 11/1996 | Naum | |
| 5,633,748 A | 5/1997 | Perez et al. | |
| 5,845,038 A * | 12/1998 | Lundin | G02B 6/001 362/551 |
| 5,905,837 A | 5/1999 | Wang et al. | |
| 5,982,962 A | 11/1999 | Koops et al. | |
| 6,104,371 A | 8/2000 | Wang et al. | |
| 6,347,172 B1 | 2/2002 | Keller et al. | |
| 6,398,778 B1 | 6/2002 | Gu et al. | |
| 6,519,401 B1 | 2/2003 | Imamura et al. | |
| 6,546,174 B2 | 4/2003 | Clarkin | |
| 6,614,172 B2 | 9/2003 | Chiu et al. | |
| 6,636,686 B1 | 10/2003 | Belfer | |
| 6,655,825 B2 | 12/2003 | Muthu et al. | |
| 6,714,185 B2 | 3/2004 | Kim et al. | |
| 6,714,711 B1 | 3/2004 | Lieberman et al. | |
| 6,848,822 B2 * | 2/2005 | Ballen | F21V 33/00 362/577 |
| 6,896,398 B2 | 5/2005 | Chambers et al. | |
| 7,024,076 B2 | 4/2006 | Ohta et al. | |
| 7,437,035 B2 | 10/2008 | Carver et al. | |
| 7,505,655 B2 | 3/2009 | Yamazaki et al. | |
| 7,512,300 B2 * | 3/2009 | Robertson | G02B 6/0006 362/630 |
| 7,780,326 B2 | 8/2010 | Ito | |
| 7,826,698 B1 | 11/2010 | Meir et al. | |
| 7,868,341 B2 | 1/2011 | Diana et al. | |
| 8,897,612 B2 | 11/2014 | Logunov | |
| 2001/0022342 A1 * | 9/2001 | Wirthlin | G01C 9/06 250/229 |
| 2002/0018629 A1 | 2/2002 | Lieberman et al. | |
| 2005/0012076 A1 | 1/2005 | Morioka | |
| 2006/0001037 A1 | 1/2006 | Schardt et al. | |
| 2007/0053634 A1 | 3/2007 | Carver et al. | |
| 2007/0263405 A1 * | 11/2007 | Ng | G02B 6/0003 362/555 |
| 2008/0017872 A1 | 1/2008 | Kim, II | |
| 2008/0069497 A1 | 3/2008 | Tissot et al. | |
| 2008/0069560 A1 | 3/2008 | Tissot et al. | |
| 2009/0027914 A1 | 1/2009 | Wu | |
| 2009/0207867 A1 | 8/2009 | Shapira et al. | |
| 2009/0257242 A1 | 10/2009 | Wendman | |
| 2009/0298406 A1 * | 12/2009 | Norbury, Jr. | B60H 1/34 362/459 |
| 2010/0014309 A1 * | 1/2010 | Heidinger | G02B 6/001 362/509 |
| 2010/0053970 A1 * | 3/2010 | Sato | G02B 6/001 362/259 |
| 2010/0066254 A1 | 3/2010 | Ott et al. | |
| 2010/0165599 A1 | 7/2010 | Allen | |
| 2010/0177505 A1 * | 7/2010 | Ho | A42B 3/044 362/106 |
| 2010/0238374 A1 | 9/2010 | Ohse | |
| 2010/0271842 A1 | 10/2010 | Cheang et al. | |
| 2010/0283376 A1 | 11/2010 | Kanade et al. | |
| 2011/0204405 A1 | 8/2011 | Tsutsumi et al. | |
| 2012/0050683 A1 * | 3/2012 | Yates | A61B 3/1208 351/219 |
| 2012/0106127 A1 | 5/2012 | Hattori et al. | |
| 2012/0275745 A1 | 11/2012 | Logunov | |
| 2013/0272014 A1 | 10/2013 | Logunov et al. | |
| 2014/0098011 A1 | 4/2014 | Gollier | |
| 2014/0140090 A1 | 5/2014 | Logunov et al. | |
| 2014/0226353 A1 * | 8/2014 | Sohizad | G02B 6/001 362/511 |

FOREIGN PATENT DOCUMENTS

| | | |
|---|---|---|
| EP | 1376003 | 1/2004 |
| EP | 2302427 A1 | 3/2011 |
| JP | 05288935 | 11/1993 |
| JP | H08320417 | 12/1996 |
| JP | 2000039517 | 2/2000 |
| JP | 2000147263 | 5/2000 |
| JP | 2002367404 | 12/2002 |
| JP | 2004287067 | 10/2004 |
| JP | 2007227573 | 9/2007 |
| JP | 2008505440 | 2/2008 |
| WO | WO-9922174 | 5/1999 |
| WO | WO-2006007097 | 1/2006 |
| WO | WO-2009004597 | 1/2009 |
| WO | WO-2009004597 A2 | 1/2009 |
| WO | WO-2009040725 | 4/2009 |
| WO | WO-2009040725 A2 | 4/2009 |
| WO | WO-2010044239 | 4/2010 |
| WO | WO-2011063214 A1 | 5/2011 |
| WO | WO-2012146960 | 11/2012 |
| WO | WO-2012146960 A1 | 11/2012 |
| WO | WO-2013052413 A1 | 4/2013 |
| WO | WO-2013055842 | 4/2013 |
| WO | WO-2013066668 A1 | 5/2013 |
| WO | WO-2013140484 | 9/2013 |
| WO | WO-2013191690 | 12/2013 |
| WO | WO-2015031551 A1 | 3/2015 |
| WO | WO-2015056220 | 4/2015 |

OTHER PUBLICATIONS

PCT International Preliminary Report on Patentability (dated Nov. 7, 2013), International Application No. PCT/B2012/000617—International Filing Date Mar. 28, 2012, 8 pages.

PCT International Search Report and Written Opinion (dated Jan. 9, 2015), International Application No. PCT/IB2014/065386, International Filing Date Oct. 17, 2014, 10 pages.

China Office Action (dated Nov. 3, 2015), Chinese Patent Application No. 20128003264.4, 26.

Japanese Office Action (dated Feb. 16, 2016), Japanese Application No. 2014-506942, 8 pages.

Carver, G. E , et al., "A Fiber Grating Based Distributed Light Source", Photonic Sensing Technologies, Proc. of SPIE, vol. 6371, 63710H-1, (2006), 7 pages.

Spigulis, Janis , "Side-Emitting Fibers Brighten Our World in New Ways", OPN Oct. 2005, Internet Document at: www.osa-opn.org, 6 pages.

Non-Final Office Action (dated May 6, 2016), U.S. Appl. No. 14/113,905, Filing Date: Dec. 3, 2013, First Named Inventor: Yann Tissot, 7.

International Search Report and Written Opinion, dated Mar. 31, 2017, Application No. PCT/IB2016/057738.

European Examination Report, dated Mar. 21, 2017, European Application No. 12720570.6.

Translation of Japanese Office Action, dated Nov. 1, 2016, Japanese Application No. 2014-506942.

"Fiber Optic V-Grooves & Arrays", Fiberguide Industries, The Fiber Optic Solutions Company, (Jun. 27, 2012), 1.

PCT International Written Opinion of ISA (dated Apr. 19, 2016), International Application No. PCT/IB2014/065386, International Filing Date Oct. 17, 2014, 6.

European Office Action (Article 94(3)) dated Mar. 13, 2019 for related European Appln. No. 14787292.3 5 Pages.

Communication pursuant to Article 94(3) EPC dated Nov. 18, 2019, European application No. 14787292.3 filed Oct. 17, 2014.

* cited by examiner

HOLDER AND SYSTEMS FOR WAVEGUIDE-BASED ILLUMINATION

RELATED MATTERS

The present application is a national phase application that claims the benefit of International Patent Application No. PCT/IB2014/065386, filed Oct. 17, 2014, which in turn claims the benefit of the earlier filing date of U.S. Provisional Application No. 61/892,899 filed Oct. 18, 2013, entitled "Holder and Systems for Waveguide-Based Illumination".

Some aspects of the disclosure here refer to items described in published International Application No. PCT/IB2012/000617 entitled, "Waveguide apparatus for illumination systems" ("My Prior Application").

An embodiment of the invention is a holder that is used in a fiber-based side-illumination system to protect or accommodate an illuminating optical fiber and/or to determine or modify the illumination scheme of the illuminating fiber by selective absorption, reflection or transmission. Examples of holders for technical lighting are also described. Other embodiments are also described.

BACKGROUND

An optical fiber is known to bring an optical signal from one fiber end to another fiber end without significant losses. In other cases, the fiber is designed to leak the optical signal in a direction substantially transverse to the propagation direction of the optical signal. This effect is typically the result of the interaction of light (the optical signal) with integrated scattering structures in the fiber or the result of a specific fiber design. The scattering elements may be realized by adding elements such as impurities while drawing the fiber, by processing holes within the fiber, or through mechanical, laser or chemical processing of the fiber.

In still other cases, luminescent materials are integrated inside the fiber-core material, inside the cladding or inside the coating of the fiber to partially or completely convert the propagating wavelength to lower or higher wavelengths.

SUMMARY

The illumination schemes of the different cases described above may need to be controlled, conditioned, or accommodated by an appropriate waveguide holder that conforms to the side surface of the waveguide (which may be an optical fiber) in order to produce an appropriate side illumination or technical lighting, by selective reflection, absorption or transmission.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention, and not all elements in the figure may be required for a given embodiment.

FIGS. 7a, 7b and 7c are example radiation patterns for the out-coupled light (or the re-directed primary propagating light in the waveguide).

DETAILED DESCRIPTION

In accordance with an embodiment of the invention, a fiber side-illumination system has a light source that is coupled to an optical fiber that has a core and a cladding. The resulting propagating light from the source is scattered out of the fiber through its side, by a scattering structure located in the core, or also in the cladding. The scattered radiation or out-coupled light takes place in a direction substantially transverse to the longitudinal axis of the fiber either in a directional manner (forming a cone of light having a radial span of under 360°) or in an isotropic manner (all around the fiber). Examples of scattering structures that can yield such a result can be found in My Prior Application, including in particular, laser-induced structures previously formed in the core. A fiber holder holds and protects the fiber along its side. The holder can also serve to shape the flexible fiber, to yield a specific illumination scheme or pattern of radiation that emerges from the side of the holder.

The light source may be any suitable radiation source or sources. For example, the source may have an incoherent, relatively broad spectrum such as from a discharge lamp or an LED. It may also be an organic light emitting diode (OLED) or a source based on quantum dots. The source may alternatively be a coherent, sharp spectrum light source such as a laser emitting a single wavelength (also referred to here as quasi single wavelength), or it may be multiple single wavelength lasers. The source is not limited to a specific part of the light spectrum. Examples include a source that emits substantially in the UV-, Visible or infrared part of the spectrum. Other possibilities include working in the microwave and millimeter wave regions. Further examples of the light source can be found in My Prior Application.

The optical fiber may be any suitable optical fiber such as single clad, multi-clad, photonic-crystal or micro-structured optical fiber. The fiber may be passive, i.e. the light propagates substantially at the same wavelength all along the fiber, or it may be active i.e., the propagating light is partially or totally converted by luminescent species or material implemented inside the fiber-core, cladding or inside the coating of the fiber.

The optical fiber could be replaced by another suitable waveguide, such as a light pipe having a core medium but no cladding layer, e.g. a transparent rod.

The scattering structures may be particles, impurities, or holes directly integrated during fabrication of the waveguide (e.g., during the drawing of the optical fiber).

The scattering structures may be continuous or discontinuous laser-induced structures; these may be formed through the application of external intense laser light to selected locations in the waveguide. The location, the shape, the size, the scattering strength, the tilt or orientation, and periodicity of the scattering structures, along and across (transverse to) the guided light propagation direction (longitudinal axis) in the waveguide can be selected, by adapting the focus, intensity and position of the external processing laser. Specifically, these parameters may be adapted to obtain a desired radiation pattern. See My Prior Application for further details.

The scattering structure may also be mechanical taps chemically or mechanically processed on the fiber cladding.

In another embodiment, the out-coupled light may be pursuant to a leaky mode of propagation in the waveguide. The leaky mode may occur due to interaction of the propagating light with changes, such as a gradient, in the index of refraction of the fiber or changes in the radius or geometry of the fiber (which changes may have been induced while drawing the fiber, for example).

The luminescent or photo-luminescent species or material that may be used in the fiber, or, as mentioned below, outside the fiber and in the holder, can be any material that absorbs light at a certain wavelength and in response re-emits light at another wavelength. For instance, these materials can be one or several phosphors that re-emit light at longer wavelengths (down-conversion phosphors) or at shorter wavelengths (up-conversion phosphors). These species can also be one or several types of quantum dots. In one embodiment, the addition of the photo-luminescent material is designed to efficiently produce white illumination light suitable for illuminating samples for quality inspection, where the white light is a combination of the scattered and out-coupled "primary" light that has been wavelength converted into "secondary" light, plus any portion of the primary out-coupled light that was not wavelength converted.

The holder holds the fiber in place. It has an inner surface that partially conforms to the side of the fiber, as it runs longitudinally or along a length direction of the fiber. The holder, the fiber and the coupled light source together act as an illumination device that illuminates the external space that adjoins the holder and/or the fiber. Note that the light source may be located away from the illumination space, because the primary light from the light source may be efficiently delivered to the scattering structures via propagation through an upstream portion of the fiber that is positioned in the holder or through another fiber or waveguide that is coupled to the holder-positioned fiber. The holder can play a passive role, i.e. to simply hold the fiber and not alter the out-coupled light that emerges from the side of the fiber. Alternatively, the holder may play an active role, i.e. to directly or indirectly impact the shape, the spectrum, and/or the polarization of the illumination pattern and its spatial distribution.

In one embodiment, the holder can partially or completely be made out of a reflective material or a diffusing material such that it spreads or re-directs a portion of the out-coupled light, or a portion of the spectrum of the out-coupled light, that is scattered out of the side of the fiber. In another embodiment, the holder can be coated with a reflective material.

In another embodiment, the holder can be made of an absorptive material such that it selectively suppresses or blocks one or more portions of the out-coupled light, i.e. in a spatial sense. Alternatively, the absorptive material may be designed to selectively suppress or block a portion of the spectrum of the out-coupled light, so that for instance the resulting illumination pattern contains only selected wavelengths or colors.

In another embodiment, the holder can be made of a transparent or semi-transparent material such that it might ease the integration of the fiber shape into other systems. In this embodiment, the holder and in particular its outer surface can be shaped in order to form a diffractive or refractive optical element from which the illumination emerges.

In another embodiment, the holder can be active, e.g. partially or completely made of a material that contains luminescent species, or coated with a material that contains luminescent species. In that case the out-coupled light (which is scattered outside the fiber), or the illumination that emerges from the holder, has been partially or completely wavelength-converted by the luminescent species.

In one embodiment, the holder is elongated, or has a beam-like support structure, and can be made into different shapes and of different materials in order to integrate itself and the side-illuminating fiber into a final product. The holder can almost have as many different shapes as the flexibility of the fiber itself allows. For instance, the holder can be made of a polymer (e.g., a plastic), and may be shaped as a ring (circular or elliptical), a partial ring or curve, or a straight line or substantially U-shaped (e.g., parabolic). The beam-like support structure of the holder may also have corners around which the fiber can be routed, and as such the holder may have a polygon shape. The holder may be composed of two or more pieces that have been fixed adjacent to each other at their ends (either adjoining or abutting each other at the adjacent ends, or having a gap between the adjacent ends) to achieve the desired routing or shape for the fiber, e.g. two hemi-spherical pieces joined at their ends to form a circle.

The holder can be made of a module of two or more components each having a different role. For example, as seen and described in FIG. 2b, the holder may be composed of two elongated components or pieces, each defining about one half of the cross section of a complete groove; these two pieces are then joined to each other, lengthwise along their respective side surfaces (rather than at their ends), resulting in the complete groove. Other ways of decomposing the design of the holder 101 into two or more constituent components are possible.

The holder can be flexible, i.e. it can be bent while the positioned fiber also bends in the same way, or it can be fixed (rigid) relative to the bending ability of the fiber itself.

Figure 1:
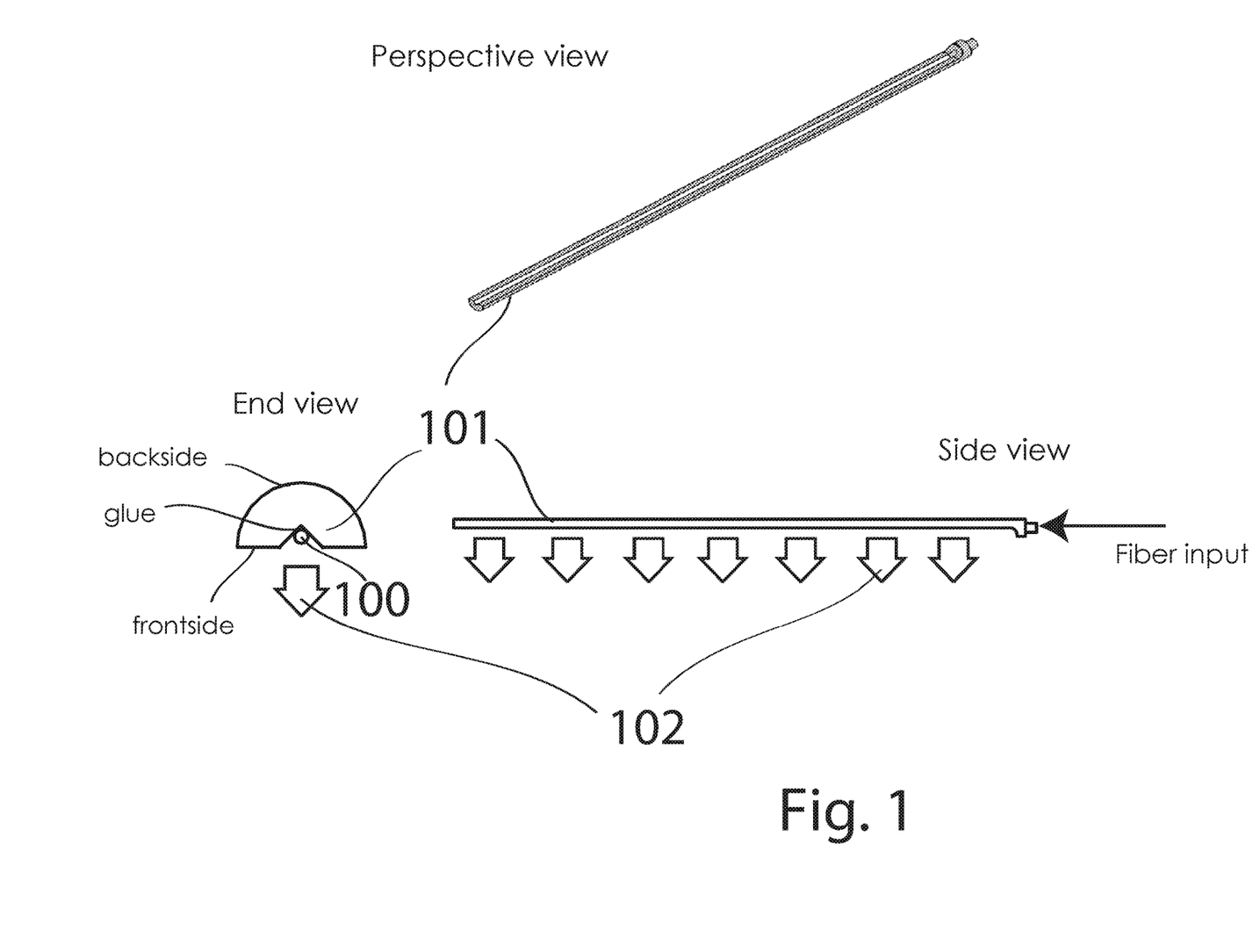
FIG. 1 depicts a perspective view, an end view and a side view of a holder in which an illumination waveguide has been fixed, in accordance with an embodiment of the invention.

FIG. 1 shows an embodiment of a holder 101 that is shaped as a straight line, to yield a straight-line illumination pattern. An illuminating waveguide 100 (e.g., a single optical fiber) is fixed on its side to the surface of a groove that runs longitudinally along the holder 101. At one end of the holder may be a fiber input coupling where light from a light source (not shown in FIG. 1) enters the waveguide 100 and propagates along the longitudinal axis of the waveguide 100, and while doing so encounters the scattering zones that redirect it out of the waveguide through the side of the waveguide thereby contributing to the emerging side illumination 102. The surface of the groove can be V-shaped (as shown in the figure), parabolic-shaped, elliptical shaped, or any shape suitable for gluing the waveguide 100 in position within the groove (to achieve the desired illumination pattern). For better illumination, the groove may be elliptical. Alternatively, the groove may be U-shaped e.g., having either smooth corners or right angled corners, like a slot, in which case the fiber 100 can be fixed into position inside the groove via an interference or press fit in which the U-shaped structure flexes as the waveguide 100 is inserted, to thereby grip the waveguide 100.

In FIG. 1, the holder 101 is an elongated support structure that roughly resembles a beam, and in which the groove, in this case having a V-shape, is running longitudinally along the beam structure as shown. In one embodiment, the outward facing surface of the groove is reflective, e.g. a reflective coating has been applied, such that it redirects a "backward" directed part of the out-coupled light (that is spread transversally outside of the waveguide) to join a "forward" directed part, into one preferred transverse or radial direction being the "forward" direction, and having a predefined radial spread, thereby resulting in side-illumination 102 emanating outward from the groove, as shown in the figure. The reflective surface may be specular or mirror-like, or the reflective surface may be diffusing.

In one embodiment, the support structure of the holder is produced by injection molding, and is over-molded over the waveguide 100 to thereby form a single part.

Figure 6:
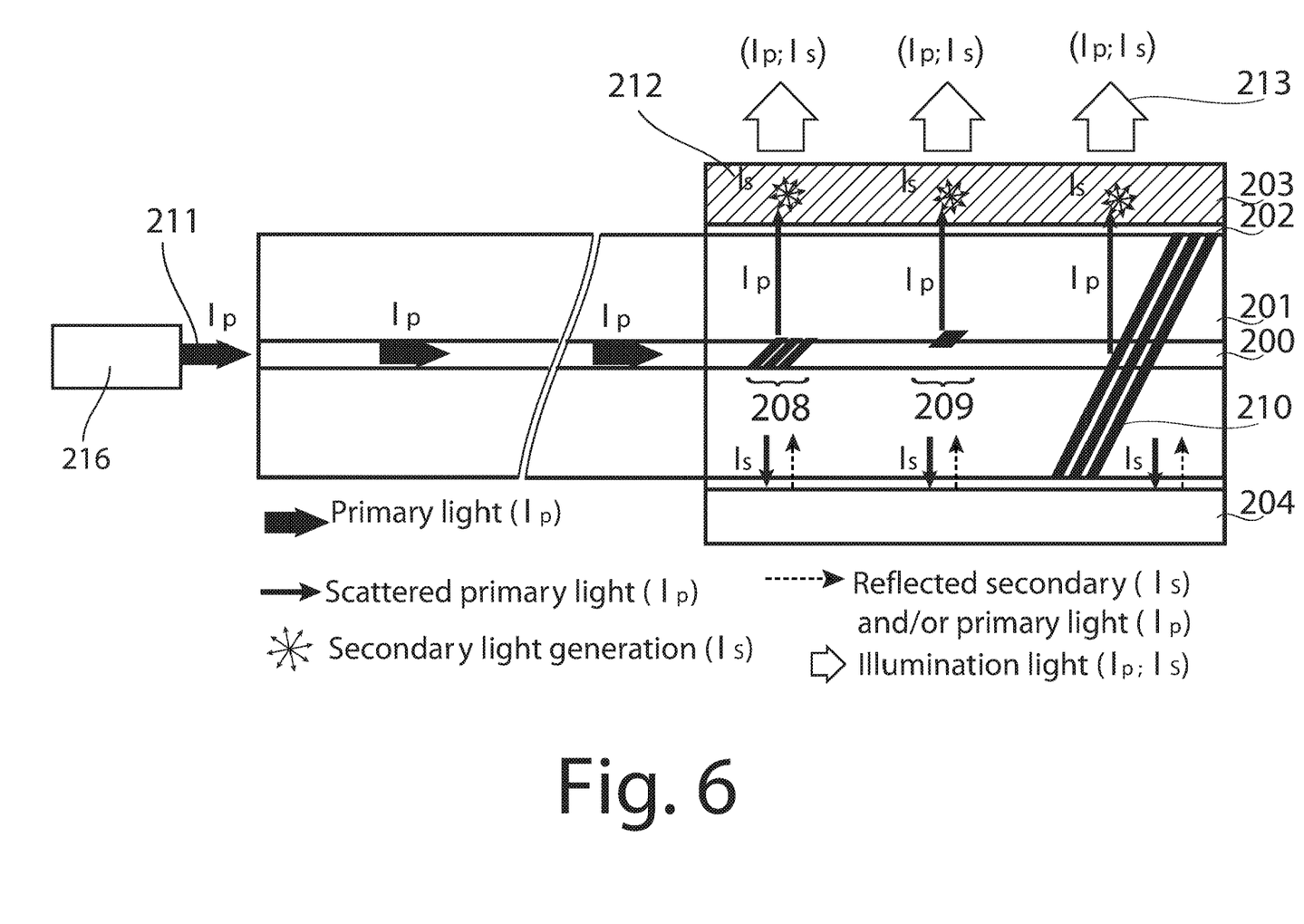
FIG. 6 is a sectional side view of a waveguide apparatus showing various types of scattering structures of various shapes and periodicity that can re-direct the primary propagating light in the waveguide.

In one embodiment, a luminescent (also referred to as photo-luminescent) material or species is added as part of a layer or coating on the waveguide 100, e.g. a coating on the outside surface of a cladding layer in the case of an optical fiber—see, for example, FIG. 6 which shows how white illumination light can be produced by the light conversion capabilities of the luminescent material.

Note that in FIG. 1, the holder 101 is designed to redirect the out-coupled light outward from the mouth of the groove ("front side" of the holder); as an alternative, the side of the waveguide 100 could be radially positioned or orientated so that most of the out-coupled light is directed inward (into the groove)—in that case, the holder 100 may be transparent or semi-transparent so as to allow the transmission of the absorbed out-coupled light which then emerges from the "back side" of the holder 101.

Note also that in one embodiment, at least one part of the holder 101 may be designed to block or absorb some of the out-coupled light, thereby rendering a restricted or segmented (or discontinuous) illumination pattern, where in effect one or more segments of the holder allow the out-coupled light to pass and illuminate the external space while others do not. For example, it may be desirable to "hide" a part, not all, of the waveguide 100 by an opaque portion (not shown) that is in front of the out-coupled light that is emerging from the side of the waveguide 100. The opaque portion may be attached to the support structure of the holder 101. In one embodiment, the opaque portion can be moved along the support structure in the longitudinal direction. For example, the opaque portion may be a curved "sector" piece that fits into an outside track (not shown) that is formed on the outside of the support structure, and/or an inside track (not shown) that is formed in the groove, where both tracks run longitudinally around the ring. The sector piece may, for example, have a length of ¼ the ring circumference, and can be moved around the ring-like support structure of FIG. 2a, to any desired position where the out-coupled light is to be blocked or absorbed (thereby not contributing to the final illumination). For example, the ¼ sector piece may be moved to hide the 12 o'clock-3 o'clock sector in one situation, and then moved to hide the 6 o'clock-9 o'clock sector in another situation. Of course, this is only an example as the sector piece may be shorter or longer than ¼ of the ring circumference.

Figure 2A:
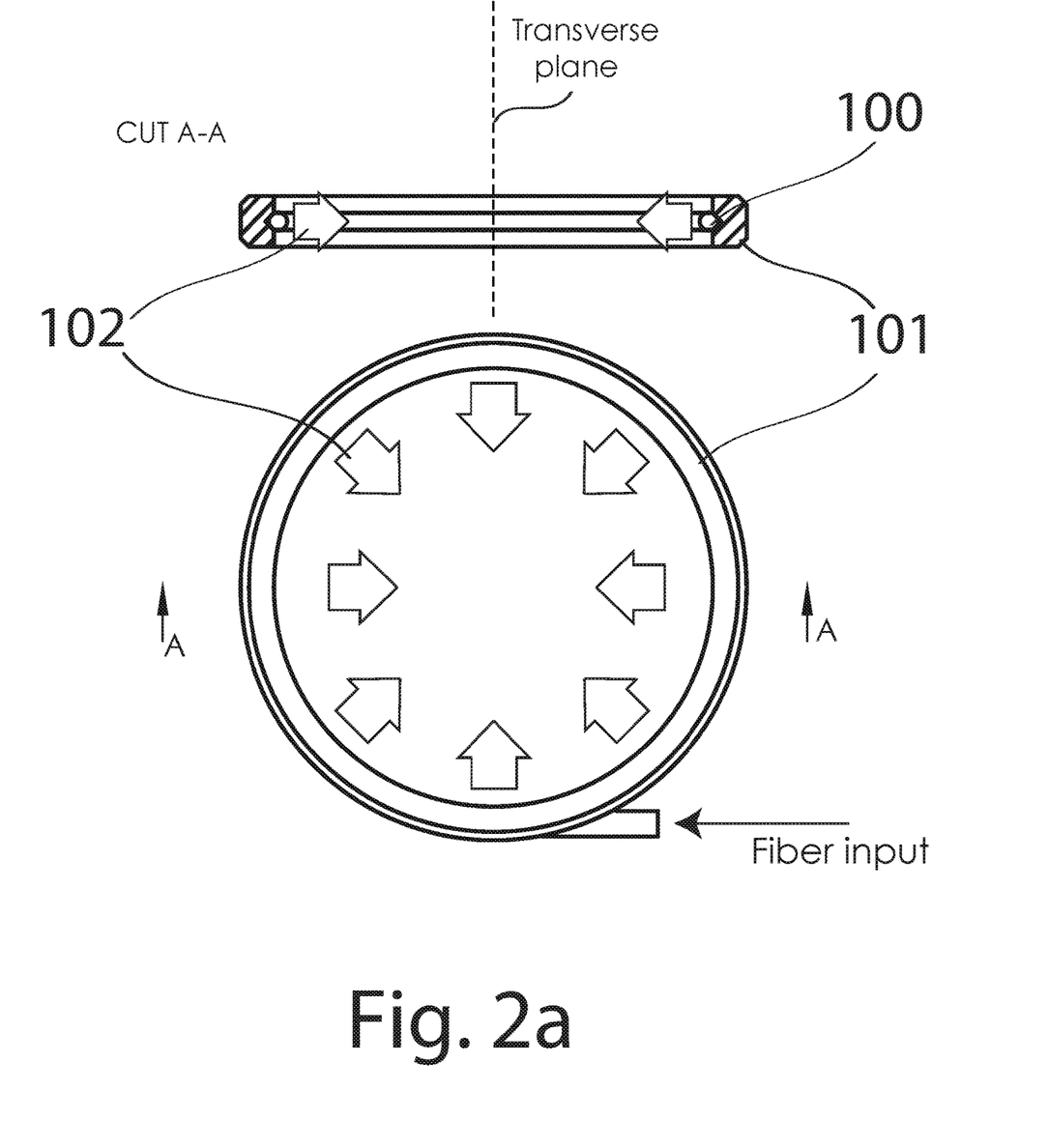
FIG. 2a illustrates a top view and a cross section view of a ring-shaped holder in which an illumination waveguide has been fixed.
Figure 2B:
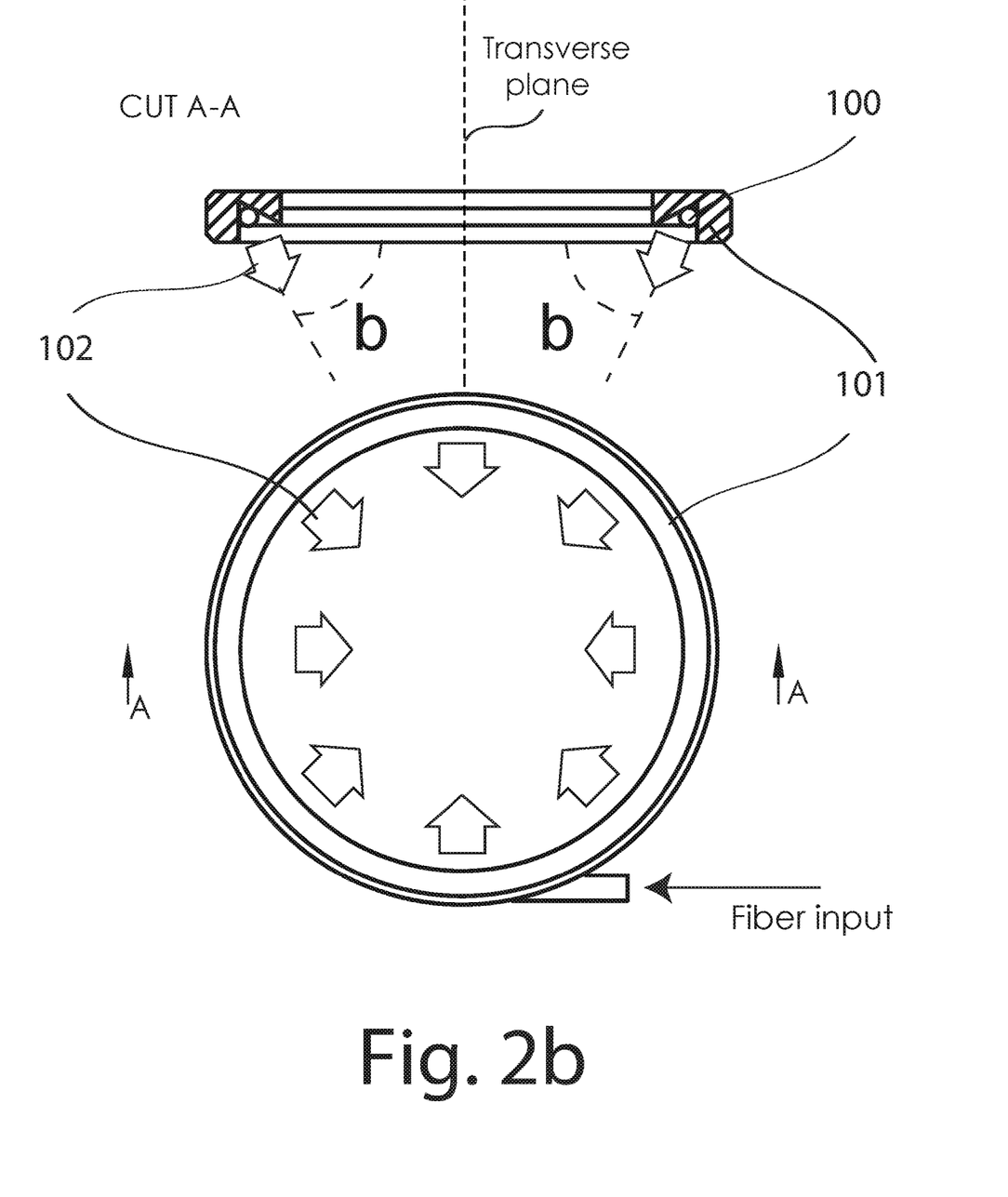
FIG. 2b illustrates a top view and a cross section view of another ring-shaped holder in which an illumination waveguide has been fixed.

FIG. 2a and FIG. 2b show another embodiment of the holder 101 being an elongated support structure that is lengthwise shaped as a ring. The waveguide 100 is fixed inside the groove thereby adopting the lengthwise ring shape of the groove. In this embodiment, the ring shaped support structure is reflective on its inner surface (the surface of the groove) such that it redirects the backward part of the out-coupled light (that is spread transversally outside of the waveguide) to join the forward part that is directed outward from the mouth of the groove, and having a predefined radial spread, resulting in the side-illumination 102 as shown.

In FIG. 2a the ring structure of the holder 101 and the groove therein are designed such that the out-coupled light is redirected at a small angle relative to the plane of the ring structure, i.e. the out-coupled light pattern lies substantially in the plane of the ring structure itself, forming a "low angle distributed ring of light", similar to a dark-field illumination system. This may be achieved by, for example, orienting the groove such that the plane of the ring structure bisects the groove, as shown. In other words, the groove may be oriented so that the angle b (beta, not shown in FIG. 2a but see FIG. 2b) defined between a) the axis of symmetry of the groove and b) the horizontal plane of the ring structure, is less than thirty degrees. In one embodiment, the waveguide 100, including the scattering structures therein, any photo-luminescent layer formed on the outside surface of waveguide, and the reflective surface of the groove may be designed in this case to yield an illumination 102 whose radial spread (about the longitudinal axis of the waveguide 100) is less than 180°.

In contrast, in FIG. 2b, the ring structure (and groove therein) are designed such that the out-coupled light is redirected at a larger angle relative to the horizontally oriented plane of the ring structure, and in this case substantially downward. The out-coupled light in this case still intersects the transverse plane (which, as shown, is transverse to the ring structure itself) but does so at an angle larger than in the embodiment of FIG. 2a (which angle is measured from the horizontal plane of the ring structure). This may be achieved by, for example, orienting the groove so that the angle b (beta) defined between a) the axis of symmetry of the groove and b) the horizontal plane of the ring structure, is greater than thirty degrees. For some applications, such as microscopy or inspection by machine vision, the angle may be between thirty degrees and ninety degrees, where the orientation of this radiation pattern may be similar to that obtained from a bright-field illumination system. The angle b (beta) may alternatively be between thirty degrees and one hundred twenty degrees. In one embodiment, the waveguide 100, including the scattering structures therein, any photo-luminescent layer formed on the outside surface of the waveguide 100, and the reflective surface of the groove may be designed together to yield illumination 102 whose radial spread (about the longitudinal axis of the waveguide 100) is less than 180°.

It should be noted that, while the term "axis of symmetry" is used here to help describe the orientation of the groove, the groove may be asymmetrical in some instances. In those instances, the term "axis of symmetry" as used in connection with the angle made relative to the horizontal plane of the ring should be interpreted as referring to the angle of the illumination 102 relative to the horizontal plane.

Figure 3:
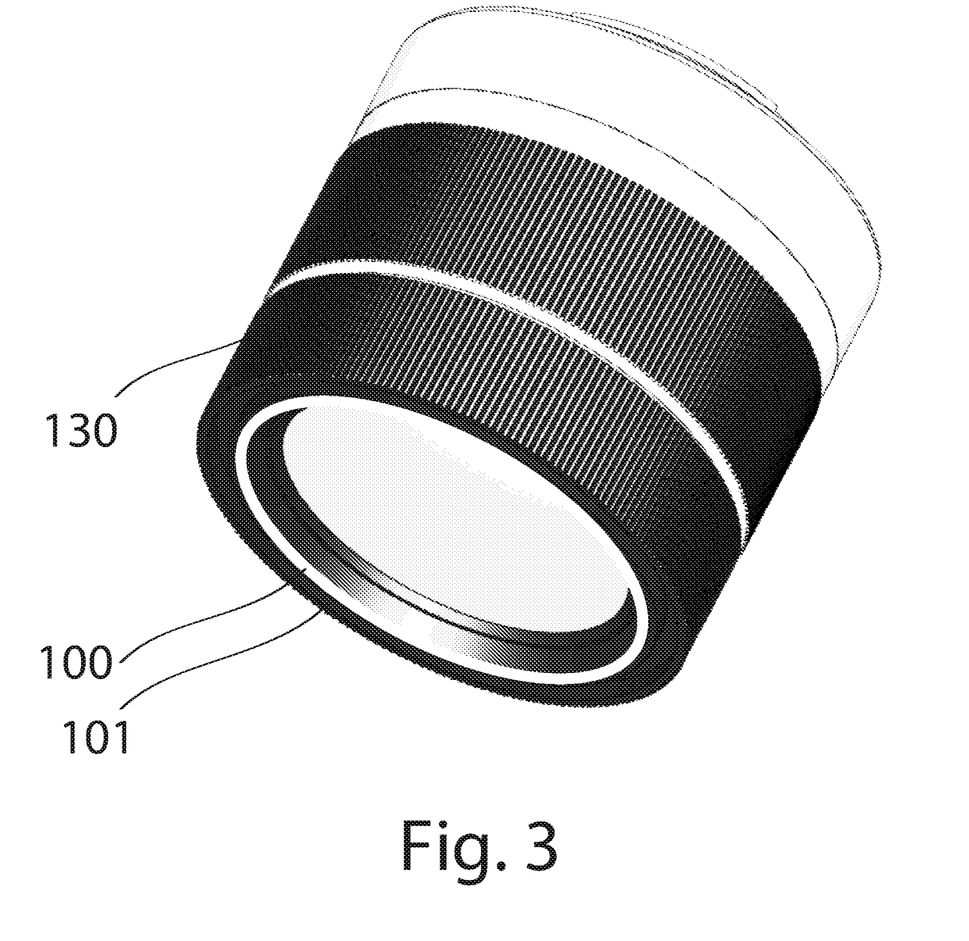
FIG. 3 shows a perspective view of an optical objective to which a ring-shaped holder (with an installed illumination waveguide) has been attached.

Both of these embodiments (in FIG. 2a and FIG. 2b) could be used in microscopy or on inspection cameras, or as a stand-alone hand magnifying lens (e.g., a loupe), for quality inspection. FIG. 3 shows an embodiment where the holder 101 has been installed into (or may have been integrated at the factory into) an optical objective 130, e.g. a single lens, or a multi-lens assembly, with or without a filter, that is to be used with a camera or an inspection device (such as a microscope, or a loupe or hand lens). The illuminating waveguide 100 and the holder 101 in this case form a ring that can be affixed to an inner surface of the objective 130 or on its outer surface, running along a periphery of one of the lenses or of a filter in the camera objective 130. For example, the holder 101 may generally conform, in a lengthwise direction, to the periphery of the lens, while the illumination is aimed inward as shown in FIG. 2a.

Figure 4:
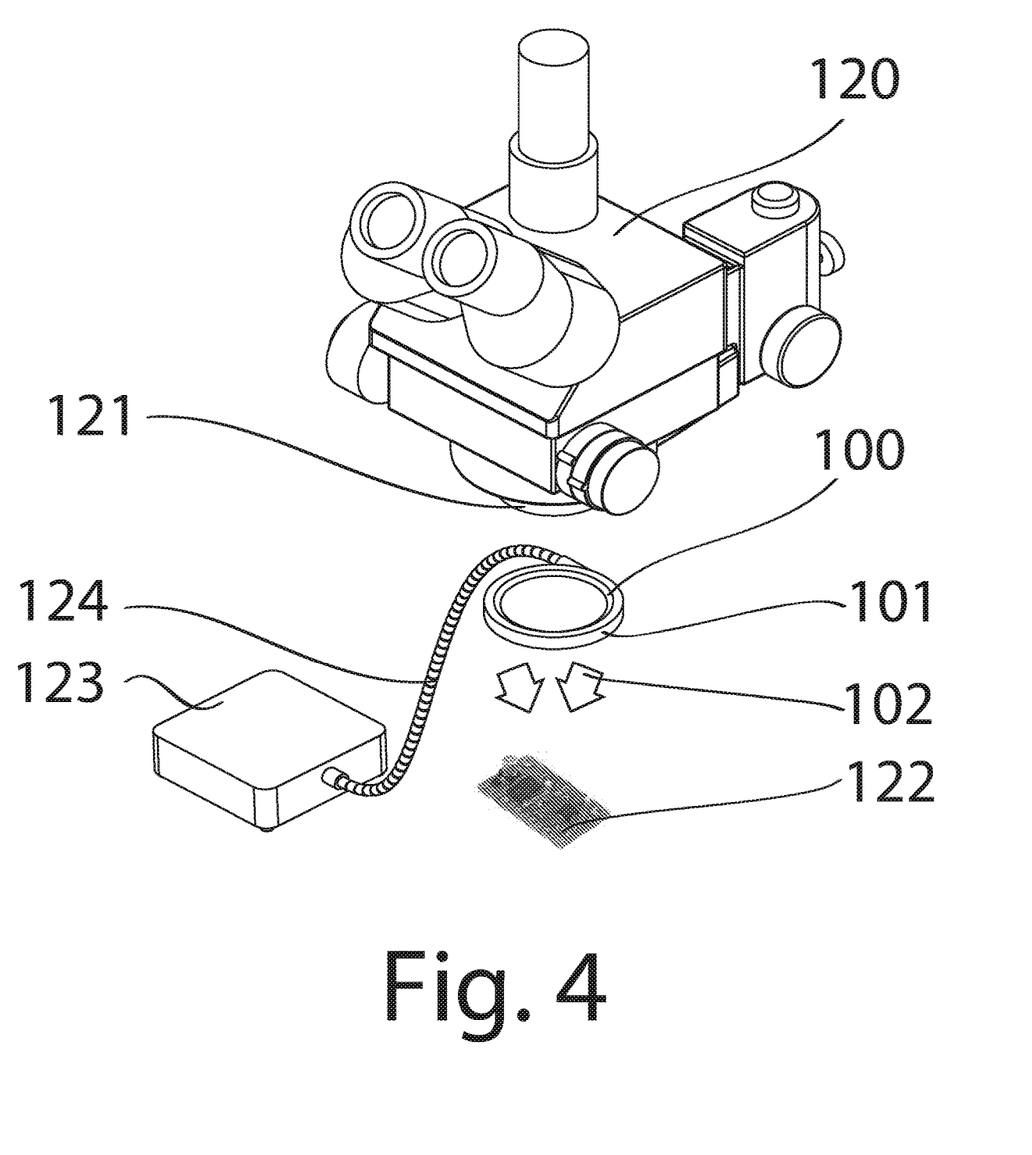
FIG. 4 depicts how a microscope can be used with a ring-shaped holder and installed illumination waveguide.

FIG. 4 shows a full system including the waveguide 100, the holder 101, a light source integrated in a separate enclosure 123, and a waveguide protection element 124 (here a gooseneck, or a stay put flexible tube) that covers the upstream portion of the waveguide 100. The waveguide 100 may continue or extend uninterrupted in an upstream direction from the holder 101, between the holder 101 and the separate enclosure 123 that contains the light source. The system here is used for the inspection of a sample 122 under a microscope 120 that has an objective 121. The holder 101 may be moved (translation, rotation or tilting) by adjusting the shape of the gooseneck, in order to obtain the optimal orientation of the illumination 102 for the inspection of the sample.

Note that in one embodiment, the upstream portion of the waveguide 100 as shown in FIG. 4, which is the portion between a) where the waveguide 100 is positioned in the holder 101 and b) where the light source is coupled to the waveguide, does not have the side scattering structures formed therein, because side illumination from the waveguide 101 may not be desired along its upstream portion. Also, the waveguide protection element 124 may initially extend in a downstream direction, beyond the upstream portion of the waveguide 100, thereby serving to protect the side-illuminating portion of the waveguide 100 until the latter portion is to be positioned within the groove of the holder 101 (e.g., via over-molding with the support structure of the holder 101, or via direct insertion of the waveguide into the groove).

Figure 5:
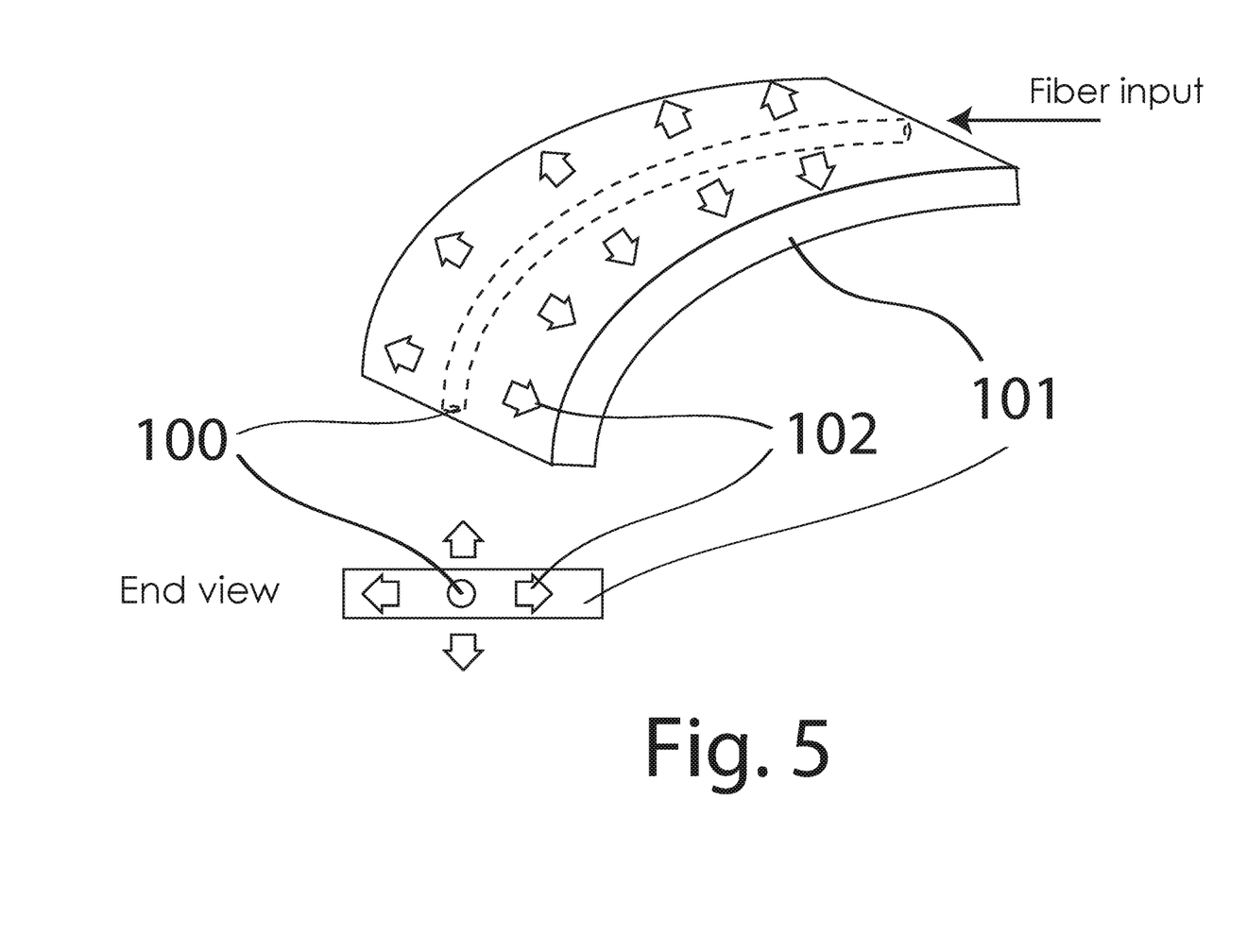
FIG. 5 contains a perspective view and an end view of a strip or ribbon as the support structure of the holder, with an illumination waveguide embedded therein.

FIG. 5. shows an embodiment where the holder 101 is a flexible, and at least partially transparent flat piece, such as a strip or ribbon. The waveguide 100 is embedded inside the holder 101, in that the holder 101 conforms to the shape of the waveguide 100, e.g. in contact with the entirety of the side of the waveguide 100. As seen in the end view shown, the out-coupled light 102 is spread both inside and outside (out of the flat portion of) the holder 101. In a specific embodiment, the holder 101 might incorporate luminescent species such that the out-coupled light from the waveguide 100 is partially or totally wavelength converted. Alternatively, the luminescent species may be part of a layer or coating that has been applied to the outside surface of the waveguide 100, prior to the waveguide 100 being embedded into the strip. The holder 101 may alternatively incorporate diffusers to partially diffuse the illumination light that emerges from the holder 101.

FIG. 6 is used to shown several ways of implementing the waveguide 100. The waveguide 100 may have laser-induced scattering structures therein that as explained below serve to redirect the primary propagating light. The laser induced scattering structures may be viewed as local modifications of the waveguide material by exposure to an external high-energy laser source. Such material modifications are not limited to local refractive index modifications but may also encompass true local material modifications (melted structures or voids). External laser processing sources that may be used include deep UV lasers (CW or excimer) that use the intrinsic photosensitivity of the waveguide material to locally modify the index of refraction; high peak power femtosecond lasers may be used in case the processed waveguide material is not sufficiently photosensitive. For instance, periodic patterns may be inscribed within a fiber core by exposing it to an intense interference pattern using an interferometer or a phase mask. Aperiodic scattering structures could be directly written inside the fiber core using the non-linear response of the glass matrix (preferred optical fiber material) to intense laser light. The strength of a structure may, for example, be in the range $\Delta n=10^{-7}$ to $\Delta n=10^{-2}$ (amplitude of change in index of refraction). The strength may be higher where the structure has melted. The period of a scattering structure (e.g., grating period) may be randomly selected, for example from the range 100 nm to 2 microns (in accordance with the wavelength of the primary light).

Still referring to section view of FIG. 6, a primary light 211, produced by a primary light source 216 (also referred to as an excitation light source, for reasons given below), in this example is coupled into (e.g., an end surface of) and guided by the waveguide 100. An alternative here is to generate the primary light inside the waveguide, e.g. using a fiber laser structure that is formed along the waveguide (e.g., by exciting a doped region of a holey fiber filled with dye). The waveguide may be composed of a core 200 covered with a cladding 201. The core medium is in contact with the cladding medium, and these are designed such that the primary light (represented by 1p in the figures) can propagate in the core in the direction shown and along the longitudinal axis of the waveguide. Here, the propagation is via total internal reflection. In one instance, the waveguide is an optical fiber, e.g. multi-mode, single-core single-clad fiber made of flexible glass, although other types of cylindrical waveguides are possible such as photonic crystal fiber, micro-structure fiber, holey fiber, multi-clad fiber, and a light pipe having a core medium but no cladding layer, e.g. a transparent rod whose peripheral surface may be coated with a mirror layer except for a remote location where the primary light is to be re-directed outward, a transparent rod without a cladding layer and whose peripheral surface is exposed to air such that the air acts as a cladding for propagating the primary light. Note that in some types of cylindrical waveguide, such as micro-structure fiber, the primary light propagates along the waveguide by a bandgap effect due to the periodic nature of the micro-structure fiber that forbids propagation in directions other than along the waveguide.

The waveguide has one or more scattering structures formed therein as shown, which serve to re-direct the propagating or incident primary light out of a side surface of the waveguide. In other words, the primary light is redirected to a desired non-zero angle (e.g., transverse or about 90 degrees) relative to the longitudinal or optical propagation axis of the waveguide. The scattering structures may be confinement regions that produce a resonance of the incident primary light, in a traverse plane (resulting in a re-directed or scattered primary light that is coherent and that may exhibit a small wavelength shift relative to the incident primary light). The scattering structures may be laser-induced structures; these may be formed through the application of external, high-energy laser light to selected locations in the waveguide, as shown. The location, the shape, the size, the scattering strength, the tilt or orientation, and periodicity of the scattering structures, along and across (transverse to) the primary light propagation direction (longitudinal axis) in the waveguide can be selected, by adapting the focus, intensity and position of the external processing laser beam. The directionality of the re-directed primary light (its radial angle about the longitudinal axis of the waveguide, and its radial spread) may be primarily a function of the tilt and period of the scattering structures, although additional parameters may need to be considered and balanced as a whole, to obtain the desired re-directed primary light radiation pattern.

In one case, a set of scattering structures 208, 209, 210 such as periodic micro reflectors or tilted gratings are formed in the waveguide. In another embodiment, the scattering structures 208-210 may be aperiodic structures such as micro-diffusers. In both cases, the scattering structures may be formed entirely inside the core 200 (depicted by structures 208), in just a portion of the interface that joins the core 200 and the cladding 201 (structures 209), and/or across the entire interface (structures 210). Any suitable combination of such structures 208-210 may be used to define a scattering structure or zone; for instance, the scattering zone may be constituted entirely of just one type of scattering structure, e.g. only entire-interface-crossing structure 210. In general, any suitable combination and/or variation of one or more of the scattering structures 208-210 that yields the desired radiation pattern for the re-directed or out-coupled primary light, $l_p$ may be used. The length of a scattering zone (containing one or more scattering structures) may be the same as or smaller than the length of the photo-luminescent layer 203 or photo-luminescent layer segment that is associated with the zone. Alternatively, the scattering zone may extend further than the photo-luminescent layer 203 or the photo-luminescent layer segment.

The waveguide in this case has a photo-luminescent layer (medium) 203, which is located so as to partially, or completely, absorb the re-directed primary light $1p$ to thereby emit secondary light 212 ($l_s$) in accordance with a photo-luminescence process. This is also referred to as wavelength converted light. The resulting combination of this secondary light 212 and any unabsorbed primary light ($l_p$; $l_s$) is the desired illumination light 213. Such an illumination system may provide special advantages in the area of cylindrical waveguide-based distributed illumination systems, including improved energy efficiency, scalability, and homogeneous light output.

The photo-luminescent layer 203 may be made of a mixture of silicone (e.g., as part of an optically clear adhesive such as polydimethylsiloxane, PDMS) or other suitable material such as epoxy, together with a phosphor. The concentration of the phosphor and the size of the phosphor particles may be selected to modify or control the color temperature and luminous efficiency of the illumination system. Note the "phosphor" as used here refers to any material that exhibits luminescence, e.g. phosphorescent materials, fluorescent materials. The layer 203 may be composed of one or more layers of different compositions. For instance, there may be one or more intermediate non-phosphor layers sandwiched by phosphor layers. The photo-luminescent layer 203 may be located outside the waveguide. The layer 203 may be deposited directly on the external side surface of the waveguide, to form an integral or single device with the waveguide. The layer 203 may cover the entire side surface of the waveguide, or as seen in FIG. 6 it may cover just the front portion of waveguide with a back portion covered by a reflector layer 204. In general, the photo-luminescent layer 203 need not entirely cover the region along the longitudinal axis of the waveguide that scatters the primary light, i.e. some of the scattered primary light could bypass the photo-luminescent layer 203 and still contribute to the desired illumination. The length of the photo-luminescent layer 203 or photo-luminescent layer segment may be equal to or larger than its associated scattering zone, and may also depend on the angle of the incident, re-directed primary light.

A protection layer (not shown) may be added, in this case in contact with the outer side surface of the photo-luminescent layer 203, to cover the latter for purposes of physical protection and/or reduction of the index of refraction step between the layer 203 and the outer medium, i.e. external to the waveguide. The protection layer may also contain or simply be an anti-reflection coating, serving to reduce or minimize any back-reflection of the secondary light $l_s$ off its back or rear surface.

Figure 7A:
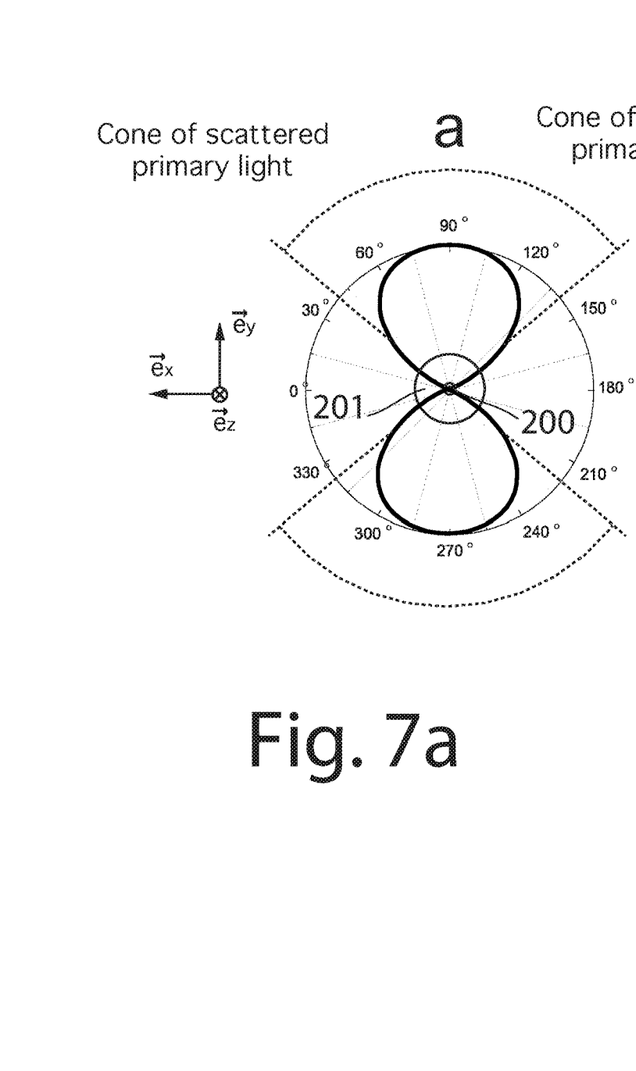
Figure 7C:
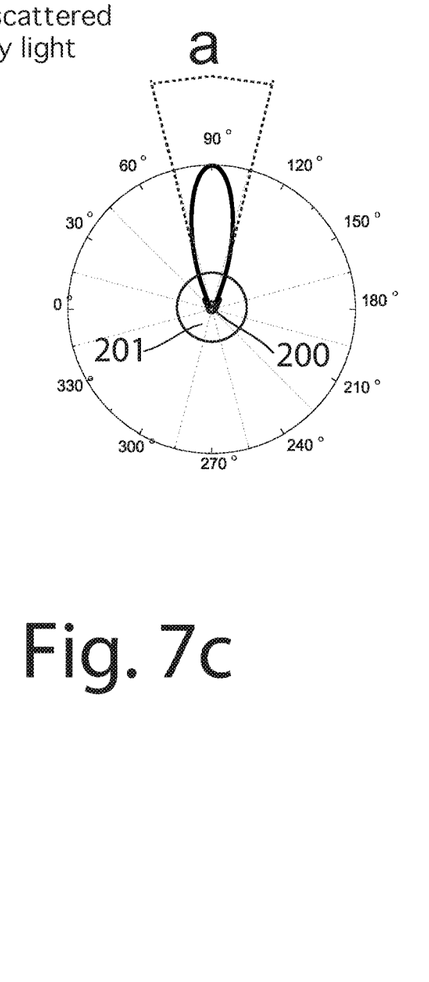

The primary light strikes the photo-luminescent layer 203 at an angle that may be defined or fixed by the shape of the scattering structure that re-directed it; this may be designed to achieve the desired conversion by the photoluminescence process. In particular, the scattering efficiency, the distribution and the directionality of the radiated primary light are given by a combination of certain characteristics of the guided primary light (e.g., its wavelength, state of polarization, modal distribution) and certain parameters of the scattering structures (e.g., their magnitude, shape, and periodicity along/across the propagation axis). FIGS. 7a-7c are sectional views of example radiation patterns for the re-directed primary light, showing three possible combinations of fiber and scattering structure parameters that provide three different scattering distributions for the primary high energy light. The radiation pattern runs along the longitudinal axis (z-direction), according to the length of the scattering zone.

In FIG. 7a, a single micro-diffuser has been processed inside the core 200 of the waveguide. The primary light 211 is launched into the core 200 in, for example, a linear state of polarization at zero degrees, in the direction of the positive z-axis (into the paper), and the resulting scattered light distribution is shown. In this case, there are two radiation lobes opposing each other, each forming a large scattering cone having a radial spread a, alpha. In contrast, FIG. 7b shows a pattern that can be produced by, e.g. a tilted grating formed inside the core 200. Here, the primary light wavelength is chosen to be at an edge of the scattering wavelength band of the tilted grating (partially coherent scattering). The scattered light distribution here also presents two main lobes together forming a medium size cone of scattering angle a, alpha. Finally, in FIG. 7c, the tilted grating has been designed such that the primary light wavelength is at a location of the scattering wavelength band of the tilted grating where there is maximum scattering (coherent scattering). The resulting scattered light distribution has a single main lobe whose angle a, alpha is smaller than in FIG. 7a. For many applications, the scattering structures should be designed to yield a radiation pattern, for the re-directed primary light, that consists of a single lobe (similar to FIG. 7c) of up to 180 degrees of radial coverage or spread.

Note that generally speaking, a scattering structure is dispersive in that different frequency or color bands will be scattered at different angles. However, in most instances, the scattering bandwidth will be much broader than the relatively narrow bandwidth of the primary light contemplated here.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, FIG. 1 shows that the groove may be about as large as the diameter of a cylindrical shaped waveguide 100, that is, the depth of the groove, as measured from the midpoint of a line that intersects its two front edges back to the vertex, is greater than the diameter of the waveguide 100. The groove may be smaller than the diameter of the waveguide 100, see e.g. FIG. 2a in the cross section view where the groove is shallower than the diameter of the waveguide 100, or it may be significantly deeper than the diameter of the waveguide 100—see FIG. 2b and the cross-section view therein. In addition, while FIGS. 2a and 2b depict a circular holder 101, the holder 101 can, more generally, have any ring-like shape that need not be a circle but instead could be oval or elliptical (like "0"—not shown). In yet another embodiment, a second ring-like support structure may be joined to the first support structure so that together they form a figure eight, or are lengthwise shaped like "8" (not shown). The second support structure may also have a groove formed along the inside surface of its ring-like support structure, similar to any of those described above. The waveguide that is held in the first support structure may extend into and also be held in position inside the groove of the second support structure. The description is thus to be regarded as illustrative instead of limiting.

What is claimed is:

1. An illumination apparatus comprising:
    an optical fiber comprising a core medium that is covered by a cladding medium and having a cylindrical shape;
    a holder having a support structure in which a groove is formed, wherein the groove is sized to receive therein a side of the optical fiber that is to be fixed in position next to a surface of the groove, wherein the groove runs in a longitudinal direction along the length of the side of the optical fiber, wherein the holder is to one of a) reflect, diffuse or absorb some light that is out-coupled from the side of the optical fiber, or b) wavelength convert some of the out-coupled light, to produce side illumination that emerges from a side of the holder, wherein the holder comprises an opaque portion that is in front of and prevents some, not all, of the out-coupled light that is emerging from the side of the optical fiber, from reaching an illumination region, while other portions of the holder allow the out-coupled light to reach the illumination region.

2. The apparatus of claim 1 wherein the support structure of the holder is a ring and wherein the groove runs along an inner surface of the ring.

3. The apparatus of claim 2 wherein the support structure is a first support structure, wherein the holder further comprises a second support structure joined to the first support structure to form a figure eight or a lengthwise shape of "8", the second support structure having a groove formed therein in which the optical fiber is fixed in position.

4. The apparatus of claim 1 wherein the holder is flexible so that a shape of the support structure, and therefore that of the side illumination, can be changed by a user's hand.

5. The apparatus of claim 1 wherein the support structure has a reflective surface that reflects some of the out-coupled light from the side of the optical fiber.

6. The apparatus of claim 1 wherein the surface of the groove is a reflective surface.

7. The apparatus of claim 1 wherein the surface of the groove has some areas that are partially reflective and some other areas that are partially absorptive.

8. The apparatus of claim 1, wherein the optical fiber comprises luminescent material that wavelength converts some of the propagating light,
    wherein said wavelength converted light and some of the propagating light that is out-coupled emerge from the side of the optical fiber.

9. The apparatus of claim 1 further comprising a light source to which the optical fiber is coupled, wherein light from the source is to propagate in a longitudinal direction of the core medium, the optical fiber having a scattering zone formed therein which causes some of the propagating light to be out-coupled along a side of the optical fiber, and wherein the holder and the optical fiber are designed such that the side illumination that emerges from a side of the holder has a radial spread of less than 180 degrees about the longitudinal axis of the optical fiber.

10. The apparatus of claim 1 wherein the optical fiber is less rigid than the support structure, in terms of a bending force applied transversely to the side of the optical fiber and to the side of the support structure, and therefore conforms to a contour or lengthwise shape of the support structure.

11. The apparatus of claim 10 wherein the optical fiber comprises a scattering zone that is adapted so that the out-coupled light has a multi-lobe radiation pattern about a longitudinal axis of the optical fiber, wherein each lobe has a radial spread that is less than 180 degrees.

12. The apparatus of claim 1 further comprising an optical lens, wherein a contour of the support structure is larger than a contour of the lens, and wherein the support structure is substantially concentric with the lens.

13. The apparatus of claim 12 wherein the optical lens and the holder form a loupe.

14. The apparatus of claim 9 further comprising a camera lens and a lens holder to which the camera lens is attached, wherein the support structure is an integral part of the lens holder.

15. The apparatus of claim 1 wherein the holder is to absorb or reflect out-coupled light from the side of the optical fiber in accordance with a predetermined spatial pattern.

16. The apparatus of claim 1 wherein the holder is to absorb or reflect out-coupled light from the side of the optical fiber in accordance with a predetermined spectral content.

17. The apparatus of claim 1 wherein the holder is transparent or semi-transparent so as to pass the absorbed out-coupled light.

18. The apparatus of claim 1 wherein the support structure comprises luminescent material that wavelength converts some of the out-coupled light from the side of the optical fiber.

19. The apparatus of claim 18 wherein the luminescent material is one of a phosphor material, a down-conversion phosphor, and quantum dots.

20. The apparatus of claim 1 wherein the holder is semi-transparent and is to selectively pass a predetermined spectral range, or one or more predetermined colors, in the out-coupled light.

21. The apparatus of claim 1 wherein the opaque portion is moveable along the support structure in the longitudinal direction to a desired location where some of the out-coupled light is blocked or absorbed thereby not contributing to the final illumination.

* * * * *